United States Patent [19]
Tanaglia

[11] Patent Number: 5,804,614
[45] Date of Patent: Sep. 8, 1998

[54] PROCESS FOR THE PRODUCTION OF ETHYLENE-PROPYLENE ELASTOMERIC COPOLYMERS

[75] Inventor: Tiziano Tanaglia, Bologna, Italy

[73] Assignee: Enichem Elastomeri S.r.L., Milan, Italy

[21] Appl. No.: 714,398

[22] Filed: Sep. 16, 1996

[51] Int. Cl.⁶ .................................................. C08K 9/02
[52] U.S. Cl. ...................... 523/204; 523/333; 524/423; 524/425; 526/124.1; 526/129; 526/904
[58] Field of Search ................................ 523/204, 333; 524/423, 425; 526/74, 78, 124.1, 129, 904, 116

[56] References Cited

U.S. PATENT DOCUMENTS

| | | | |
|---|---|---|---|
| 3,370,052 | 2/1968 | Mostardini et al. | 260/88.2 |
| 4,124,562 | 11/1978 | Yui et al. | 260/42.14 |
| 5,013,773 | 5/1991 | Nomura et al. | 523/222 |
| 5,086,132 | 2/1992 | Joyce | 526/74 |
| 5,374,695 | 12/1994 | Tanaglia et al. . | |
| 5,412,025 | 5/1995 | Fries | 524/765 |
| 5,480,850 | 1/1996 | Cann et al. | 502/107 |
| 5,491,208 | 2/1996 | Tanaglia et al. . | |

OTHER PUBLICATIONS

Patent Abstracts of Japan, vol. 095, No. 011, 26 Dec. 1995 & JP 07 224128 A (Tosh Corp), 22 Aug. 1995 *abstract*.

*Primary Examiner*—David W. Wu
*Attorney, Agent, or Firm*—Oblon, Spivak, McClelland, Maier & Neustadt, P.C.

[57] ABSTRACT

Process for the preparation in liquid phase of copolymers of ethylene with propylene and optionally another diene, in the presence of a catalyst selected from (a) Titanium salt supported on magnesium salt and (b) compound of Vanadium soluble in hydrocarbon solvents either supported on an inert material or prepolymerized, and a co-catalyst essentially consisting of an organic compound of Aluminium, and a possible chlorinated activator, characterized in that:

1) when the polymerization is almost complete, a solid material insoluble in the reaction environment and having an average diameter of between 0.001 and 200 microns is added to the reaction mixture;
2) the suspension of polymer and solid material are kept in contact for a sufficient time to obtain perfectly free-flowing polymeric particles;
3) the perfectly free-flowing polymeric particles of step (2) are recovered.

9 Claims, No Drawings

PROCESS FOR THE PRODUCTION OF ETHYLENE-PROPYLENE ELASTOMERIC COPOLYMERS

The present invention relates to a process, of the heterogeneous type in a suspension of liquid monomer, for the production of ethylene-propylene elastomers (EP) and ethylene-propylene-diene elastomers (EPDM).

More specifically, the present invention relates to a process for the production of the above elastomers in a free-flowing and subdivisible form.

Processes for the production of EP(D)M in suspension involve an evaporation phase of the solvent which is carried out in steam strippers containing water as dispersing medium. The polymer particles are not in fact free-flowing and cannot therefore be processed downstream of the reactor without a dispersing medium.

IT-A-MI 94 A 02528 (of Dec. 15, 1994) of the same applicant describes heterogeneous catalysts capable of producing EP(D)M which, although maintaining the same characteristics as normal EP(D)M, are in a subdivided form in the reaction slurry. During the reaction medium evaporation, however, the above particles tend to reform agglomerates, which however are easy to break.

The process described in the patent application filed by the same applicant IT-A-MI 95 01403 of Jun. 30, 1995, which describes a process using prepolymerized catalysts, has the same disadvantage.

U.S. Pat. No. 5,086,132 describes a process for obtaining non-agglomerated polymers with a process in suspension which involves the use, during the polymerization itself, of solid granular material having dimensions of less than 10 microns, particularly carbon black, silica, metal oxides, clays.

The process described in U.S. Pat. No. 5,086,132 has various disadvantages however.

First of all, as the catalytic system is of the Ziegler-Natta type, the materials used must necessarily have a high purity.

In addition, the above process has a serious disadvantage due to the decrease in the catalytic yield (see experimental examples of U.S. Pat. No. 5,086,132) of more than 50%, passing from the comparative test to that in which the polymer is free-flowing due to the effect of the addition of 4% of carbon black. This drawback occurs in spite of a preventive treatment of the carbon black at 100° C. under vacuum for a night.

A process has now been found which overcomes the disadvantages described above.

In accordance with this, the present invention relates to a process for the preparation of copolymers of ethylene with propylene and optionally another diene in a suspension of liquid monomer, in the presence of a catalyst selected from (a) Titanium salt supported on magnesium salt and (b) compound of Vanadium soluble in hydrocarbon solvents either supported on an inert material or prepolymerized, and a co-catalyst essentially consisting of an organic compound of Aluminium, and a possible chlorinated activator, characterized in that:

1) when the polymerization is almost complete, a solid material insoluble in the reaction environment and having an average diameter of between 0.001 and 200 microns, preferably between 0.005 and 5 microns, is added to the reaction mixture;
2) the suspension of polymer and solid material are kept in contact for a sufficient time to obtain perfectly free-flowing polymeric particles;
3) the perfectly free-flowing polymeric particles of step (2) are recovered.

It is probable, but there is not yet any experimental proof, that the solid material is adsorbed onto the polymeric particles; consequently the duration of step (2) is probably linked to the necessity of adsorbing the solid material onto the surface of the polymer.

The material to be added to the polymeric dispersion can be of an organic nature (for example carbon black and products of a polymeric nature) or inorganic (for example silica, alumina and other oxides, carbonates, sulfates and silicates).

In the preferred embodiment, the material to be 10 added, as well as having the necessary average diameter, has a surface area of over 10 $m^2/g$, even more preferably of over 40 $m^2/g$, and a porosity (intended as absorption of dibutylphthalate) of more than 20 ml/100 g, preferably more than 80 ml/100 g.

In the preferred embodiment the material to be added at the end of the polymerization reaction or, in the case of polymerization in continuous, at the outlet of the polymerization reactor, is selected from carbon black and silica.

It is preferable for the silica to have average dimensions of between 0.01 and 0.025 microns, a surface area of between 130 and 200 $m^2/g$ and a porosity of between 200 and 300 ml/100 g.

With respect to the carbon black, it is preferable for it to have average dimensions of between 0.015 and 0.04 microns, a surface area of between 50 and 100 $m^2/g$ and a porosity of between 80 and 120 ml/100 g.

The quantity of material to be added to the polymeric dispersion is at least 0.05% with respect to the formed polymer, generally between 0.5 and 8% by weight with respect to the polymer. Higher quantities can be used, obviously depending on the final use of the elastomeric copolymer.

With respect to step (2), under the polymerization conditions applied, this is between 1 and 50 minutes. After 30 minutes there is normally an almost complete dispersion of the solid material.

The use of Titanium salt supported on Magnesium salt, particularly Magnesium chloride and Magnesium carboxylate, and compounds of Vanadium soluble in hydrocarbon solvents, particularly Vanadium acetylacetonate, is well-known in literature.

Processes for the production of EP(D)M in the presence of Vanadium supported on inert material and prepolymerized Vanadium catalyst, are described in two patent applications filed by the same applicant, EP-A-717.050 and EP-96 107090 respectively. The latter document describes in particular a process for the polymerization of ethylene with $C_3$–$C_{10}$ alpha-olefins, preferably propylene and optionally another conjugated diene, carried out in a suspension of liquid monomer in the presence of a catalyst containing Vanadium and a co-catalyst essentially consisting of an organic compound of aluminium and optionally in the presence of a halogenated promoter, characterized in that the above catalyst containing Vanadium, insoluble in the reaction medium, is the precipitate which is obtained by mixing, in an atmosphere of ethylene or alpha-olefins:

a) a compound of Vanadium in the oxidation state of from 3 to 5, preferably a solution or a suspension of the above Vanadium compound, and
b) an essentially hydrocarbon solution of a compound selected from those having general formula (I) $R_nAlX_m$ wherein R is a $C_1$–$C_{20}$ alkyl radical, X is a halogen, m+n=3, m is an integer from 0 to 2.

The polymerization can be carried out with hydrogen as moderator and molecular weight regulator, operating at a total pressure of between 5 and 100 bar, preferably between 8 and 30 bar, with a ratio between partial ethylene pressure and partial hydrogen pressure of over 4, preferably over 20. Other compounds however can be used as molecular weight regulators.

The polymerization temperature is usually maintained within the range of −5° C. to 65° C., preferably from 25° to 50° C. The contact times vary from 10 minutes to 6 hours, preferably from 15 minutes to 1 hour.

The elastomeric ethylene-propylene copolymers (EP) obtained with the process of the present invention contain from 35 to 85% of ethylene, preferably from 45% to 75% by weight, and have an instrinsic viscosity measured at 135° C. in o-dichlorobenzene of between 0.5 and 6 dl/g, preferably from 1 to 3. In addition to ethylene and propylene, the elastomeric EP copolymers can contain other alpha-olefins, having from 4 to 10 carbon atoms, in a quantity not higher than 10% by weight. Typical examples of these higher alpha-olefins are butene-1 and pentene-1.

As well as EP copolymers, elastomeric (EPDM) terpolymers can be obtained with the process of the present invention. In addition to ethylene and propylene, EPDM contain a third monomer selected, as is known, from:

dienes with a linear chain, such as 1,4-hexadiene and 1,6-octadiene;

acyclic dienes with a branched chain such as 5-methyl-1,4-hexadiene, 3,6-dimethyl-1,6-octadiene, 3,7-dimethyl-1,7-octadiene;

alicyclic dienes with a single ring such as 1,4-cyclohexadiene, 1,5-cyclooctadiene, 1,5-cyclododecadiene;

dienes having fused and bridged alicyclic rings such as methyltetrahydroindene, dicyclopentadiene, bicyclo[2.2.1]hepta-2,5-2,5-diene; alkenyl, alkylidene, cycloalkenyl and cycloalkylidene norbornenes such as 5-methylene-2-norbornene, 5-ethylidene-2-norbornene (ENB), 5-propenyl-2-norbornene.

Among non-conjugated dienes typically used for preparing these copolymers, dienes containing at least a double bond in a strained ring are preferred, the most preferable being 5-ethylidene-2-norbornene (ENB).

At the end of the polymerization and after the addition of the solid material according to the process of the present invention, the polymeric suspension is subjected to devolatilization of the solvent by reducing the pressure, raising the temperature and flushing with inert gas, possibly hot. The polymer in the form of free-flowing grains, gradually releases the non-reacted monomers and can be recovered in this form or reprocessed in an extruder to form granules or possibly bales for pressing.

In addition to giving polymers in a subdivided and free-flowing form (also at high temperatures), the process of the present invention enables an economically less expensive dry-finishing process compared to the usual post-treatment with water and steam.

The following examples provide a better illustration of the present invention.

EXAMPLES

All the reagents are commercial products; the solvents used in polymerization and the activators were de-aerated under nitrogen and anhydrified on alumina and molecular sieves.

The organic compounds of aluminium were used in a solution diluted in hexane.

The copolymers prepared were characterized as follows:

A) Composition: this is determined by infrared analysis of the polymer in the form of films having a thickness of 0.2 mm using an FT-IR spectrophotometer of Perkin-Elmer model 1760.

The content of propylene is determined by measuring the ratio between the band absorbances at 4390 $cm^{-1}$ and 4255 $cm^{-1}$ and using a calibration curve calibrated with standard polymers.

B) The Mooney viscosity ML(1+4) was determined at 125° C. according to ASTM D1646-87.

COMPARATIVE EXAMPLE 1

Copolymerization of Ethylene and Propylene 1675 ml of liquid propylene are placed in a perfectly anhydrous 2.8 $dm^3$ cylindrical pressure-resistant reactor equipped with a propeller stirrer. The reactor is thermostat-regulated at 40° C., is then saturated with ethylene until an overpressure is reached of 6.0 bar and then a further overpressure of 0.2 bar of hydrogen is added. The total pressure in the top of the reactor is 21.7 bar.

4.7 mmoles of DEAC (diethylalumnium chloride) dissolved in hexane and 0.118 mmoles of Vanadium acetylacetonate, abbreviated as $V(acac)_3$ dissolved in toluene containing 0.47 mmoles of ethyl trichloroacetate are then added in small portions (10).

The reaction is carried out at a constant temperature, feeding ethylene in continuous to maintain the total pressure constant.

After 60 minutes, when the reaction had come to a stop, the monomers were evaporated and 130 grams of copolymer were recovered, which proved to be completely agglomerated.

EXAMPLE 2

Copolymerization of Ethylene and Propylene 776 grams of liquid propylene are charged into the pressure-resistant reactor described in comparative example 1. The reactor is thermostat-regulated at 40° C., is then saturated with ethylene until an overpressure is reached of 6.0 bars and then a further overpressure of 0.2 bar of hydrogen is added. The total pressure in the top of the reactor is 21.7 bar.

4.7 mmoles of DEAC dissolved in hexane and 0.118 moles of $V(acac)_3$ dissolved in toluene containing 0.47 moles of ethyl trichloroacetate were then added in small portions (10).

The reaction is carried out at a constant temperature, feeding ethylene in continuous to maintain the total pressure constant.

After 60 minutes, when the reaction had come to a stop, 2 grams of carbon black of the type HAF ASTM N330 suspended in ethanol were added: the monomers were then evaporated and 140 grams of copolymer were recovered, which proved to be completely free-flowing.

The data of the characterizations are summarized in table 1.

EXAMPLE 3

Copolymerization of Ethylene and Propylene 792 grams of liquid propylene are charged into the pressure-resistant reactor of comparative example 1. The reactor is thermostat-regulated at 40° C., is then saturated with ethylene until an overpressure is reached of 5 bar and then a further overpressure of 0.2 bar of hydrogen is added. The total pressure in the top of the reactor is 20.7 bar.

4.7 mmoles of DEAC dissolved in hexane and 0.118 mmoles of V(acac)$_3$ dissolved in toluene containing 0.47 mmoles of ethyl trichloroacetate are then charged into the reactor in small portions (10).

The reaction is carried out at a constant temperature, feeding ethylene in continuous to maintain the total pressure constant.

After 60 minutes, when the reaction has come to a stop, 2 grams of carbon black of the type HAF ASTM N330 suspended in ethanol are added: the monomers were then evaporated and 110 grams of copolymer were recovered, which proved to be completely free-flowing.

The data of the characterizations are summarized in table 1.

EXAMPLES 4 AND 5

Examples 4 and 5 were carried out with a catalyst belonging to the group of catalysts based on Titanium supported on Magnesium chloride.

As an example, the catalyst used was prepared according to the method described in EP-A-523-785 and having the following weight composition: TI=12.1%, Mg=6.5%, Cl=46%, Al=1.4%, Organic Residue=34%.

COMPARATIVE EXAMPLE 4

Copolymerization of Ethylene and Propylene 827 grams of liquid propylene are charged into the pressure-resistant reactor of example 1. The reactor is thermostat-regulated at 40° C., is then saturated with ethylene until an overpressure is reached of 3 bar and then a further overpressure of 0.5 bar hydrogen is added. The total pressure in the top of the reactor was of 19.0 bar.

4.0 mmoles of TIBA (triisobutylaluminium) and an aliquot of catalyst containing 0.077 mmoles of titanium suspended in hexane were then charged into the reactor.

The reaction is carried out at a constant temperature, feeding ethylene in continuous to maintain the total pressure constant.

After 60 minutes, the monomers were evaporated and 93 grams of copolymer were recovered, which proved to be completely agglomerated. The data of the characterizations are summarized in table 1.

EXAMPLE 5

Copolymerization of Ethylene and Propylene 827 grams of liquid propylene are charged into the pressure-resistant reactor of comparative example 1. The reactor is thermostat-regulated at 40° C., is then saturated with ethylene until an overpressure is reached of 3 bar and then a further overpressure of 0.5 bar of hydrogen is added. The total pressure in the top of the reactor was 19.0 bar.

8.1 mmoles of DEAC and an aliquot of the catalyst solution containing 0.013 mmoles of Titanium suspended in hexane were then charged into the reactor.

The reaction is carried out at a constant temperature, feeding ethylene in continuous to maintain the total pressure constant.

After 60 minutes, 2 grams of silica of the type Ultrasil VN3 suspended in ethanol were added: the monomers were evaporated and 160 grams of copolymer were recovered, which proved to be completely free-flowing.

The data of the characterizations are summarized in table 1. In the above table the molar % of ethylene refers to the content of ethylene in the liquid phase, the Prop. column refers on the other hand to the content of propylene in the polymer, the yield refers to kilograms of polymer per gram of catalyst (either Vanadium or Titanium).

TABLE 1

| Ex. Nr. | % moles ethyl. | Al/V m./m | Prop. w % | Visc. ML125 | Yield kg/g | Comments |
| --- | --- | --- | --- | --- | --- | --- |
| 1C | 12 | 40 | 32.4 | 78 | 21.7 | agglomerated |
| 2 | 12 | 40 | 31.6 | 60 | 23.2 | free-flowing |
| 3 | 10 | 40 | 34.4 | 63 | 18.3 | free-flowing |
| 4C | 6 | 519 | 40.4 | 35 | 251.3 | agglomerated |
| 5 | 6 | 620 | 38.7 | 30 | 246.2 | free-flowing |

It can be observed that only the process of the present invention enables perfectly free-flowing particles of polymer to be obtained, contrary to what occurs for the processes of the prior art.

COMPARATIVE EXAMPLE 6

A) Preparation of the prepolymerized catalyst.

17.2 grams of a suspension of Vanadium (III) acetylacetonate at a concentration of 1.18% by weight of Vanadium in paraffin oil, followed by 40 ml of isopar-G are charged into a glass flask, under nitrogen and mechanical stirring.

The flask is saturated with ethylene and 16 ml of a solution of EASC (ethylaluminium sesquichloride) equal to 0.984 grams in 10 ml of isopar-G and 5 ml of hexane (AL/V=2), are added.

The mixture is left in an atmosphere of ethylene for 20 minutes during which the consumption of ethylene is observed.

The catalytic suspension is poured into a test-tube, diluted with isopar-G obtaining 100 ml of a suspension at 0.2% weight/volume of Vanadium.

B) Copolymerization of ethylene and propylene.

740 grams of liquid propylene are charged into a perfectly anhydrous 2.8 dm$^3$ cylindrical pressure-resistant reactor equipped with a propeller stirrer. The reactor is thermostat-regulated at 40° C., is then saturated with ethylene until an overpressure is reached of 8.2 bar and then a further overpressure of 0.1 bar of hydrogen is added. The total pressure in the top of the reactor is 23.8 bar.

2.74 mmoles of DEAC (diethylaluminium chloride) and subsequently an aliquot of the catalyst previously prepared equal to 0.018 grams of Vanadium suspended in hexane and containing 0.14 mmoles of ethyltrichloroacetate are then added.

The reaction is carried out at a constant temperature, feeding ethylene in continuous to maintain the total pressure constant (molar ratio Al/V=78).

After 60 minutes, the monomers are evaporated and the reactor is opened: 97 grams of polymer in a subdivided form but partially agglomerated, not free-flowing, are recovered, equal to a yield of 54 kg of polymer per gram of Vanadium. The characterizations of the copolymer are summarized in table 2.

EXAMPLE 7

Copolymerization of Ethylene and Propylene 740 grams of liquid propylene are charged into the pressure-resistant reactor described in comparative example 6, the reactor is thermostat-regulated at 40° C., saturated with ethylene until an overpressure is reached of 8.2 bar and then a further overpressure of 0.1 bar of hydrogen. The total pressure in the top of the reactor is 23.8 bar.

2.74 mmoles of DEAC and subsequently an aliquot of the catalyst of comparative example 6 equal to 0.028 grams of Vanadium suspended in hexane and containing 0.22 mmoles of ethyl trichloroacetate are then added. The reaction is carried out at a constant temperature, feeding ethylene in continuous to maintain the total pressure constant (molar ratio Al/V=50).

After 60 minutes, 2.5 grams of carbon black of the type HAF ASTM N330 suspended in methanol are added to the reaction mixture. The monomers are evaporated and the reactor is opened. 151 grams of polymer in a subdivided form and perfectly free-flowing, are recovered, equal to a yield of 54 kg per gram of Vanadium. The characterizations of the copolymer are summarized in table 2.

EXAMPLE 8

Copolymerization of Ethylene and Propylene 740 grams of liquid propylene are charged into the same pressure-resistant reactor used in comparative example 6, the reactor is saturated with ethylene until an overpressure is reached of 8.2 bar and then a further overpressure of 0.1 bar of hydrogen is added. The total pressure in the top of the reactor is 23.8 bar.

2.74 mmoles of DEAC and subsequently an aliquot of the catalyst used in comparative example 6 equal to 0.018 grams of Vanadium suspended in hexane and containing 0.14 mmoles of ethyl trichloroacetate are then added. The reaction is carried out at a constant temperature, feeding ethylene in continuous to maintain the total pressure constant (molar ratio Al/V=78).

After 60 minutes, 5 grams of silica of the type Ultrasil VN3 suspended in methanol are poured into the reaction mixture. The monomers are evaporated and the reactor is opened: 98 grams of polymer in a subdivided form and perfectly free-flowing, are recovered, equal to a yield of 54 kg of polymer per gram of Vanadium. The characterizations of the copolymer are summarized in table 2.

COMPARATIVE EXAMPLE 9

Copolymerization of Ethylene and Propylene 740 grams of liquid propylene are charged into the pressure-resistant reactor described in comparative example 6. The reactor is thermostat-regulated at 40° C., saturated with ethylene until an overpressure of 8.2 bar is reached, and then with hydrogen (overpressure of 0.2 bar) until the total pressure in the top of the reactor is 24 bar.

2.74 mmoles of DEAC and subsequently an aliquot of the catalyst of comparative example 6 equal to 0.028 grams of Vanadium suspended in hexane and containing 0.22 mmoles of ethyl trichloroacetate are then added.

The reaction is carried out at a constant temperature, feeding ethylene in continuous to maintain the total pressure constant (molar ratio Al/V=50).

After 60 minutes, 5 ml of Pluronic PE 6200 (ethyleneoxide-propyleneoxide copolymer) dissolved in methanol are poured into the reaction mixture. The monomers are evaporated and the reactor is opened: 128 grams of polymer in a subdivided form and partially free-flowing (presence of some agglomerates), are recovered, equal to a yield of 45.7 kg of polymer per gram of Vanadium. The characterizations of the copolymer are summarized in table 2.

COMPARATIVE EXAMPLE 10

Copolymerization of Ethylene and Propylene 507 grams of liquid propylene and 270 grams of propane as diluent are charged into the pressure-resistant reactor of comparative example 6. The reactor is thermostat-regulated at 40° C., saturated with ethylene until an overpressure of 5.5 bar is reached, and then added with hydrogen (overpressure of 0.1 bar). The total pressure in the top of the reactor was 20.3 bar.

A hexane solution containing 4.55 mmoles of DEAC (diethylaluminium chloride) and subsequently an aliquot of the catalyst of comparative example 6 corresponding to 0.03 grams of Vanadium suspended in hexane and containing 0.23 mmoles of ethyl trichloroacetate are then added. The reaction is carried out at a constant temperature, feeding ethylene in continuous to maintain the total pressure constant (molar ratio Al/V=78).

After 60 minutes, the monomers are evaporated and the reactor is opened: 93 grams of polymer in a subdivided form but partially agglomerated, are recovered, equal to a yield of 31 kg of polymer per gram of Vanadium. The characterizations of the copolymer are summarized in table 2.

EXAMPLE 11

Copolymerization of Ethylene and Propylene 507 grams of liquid propylene and 270 grams of propane as diluent are charged into the pressure-resistant reactor described in comparative example 6. The reactor is thermostat-regulated at 40° C., saturated with ethylene until an overpressure of 5.5 bar is reached and then a further overpressure of 0.1 bar of hydrogen is added. The total pressure in the top of the reactor was 20.3 bar.

A hexane solution containing 4.55 mmoles of DEAC and subsequently an aliquot of the catalyst of comparative example 6 equal to 0.03 grams of Vanadium suspended in hexane and containing 0.23 mmoles of ethyl trichloroacetate are then added. The reaction is carried out at a constant temperature, feeding ethylene in continuous to maintain the total pressure constant (molar ratio Al/V=78).

After 60 minutes, 1 gram of carbon black of the type HAF ASTM N330 suspended in methanol are poured into the reaction mixture. The monomers are then evaporated and the reactor is opened: 90 grams of polymer in a subdivided form and perfectly free-flowing, are recovered, equal to a yield of 30 kg of polymer per gram of Vanadium. The characterizations of the copolymer are summarized in table 2.

COMPARATIVE EXAMPLE 12

A) Preparation of the Supported Catalyst 5.15 grams of silica, dehydrated at 650° C. for 6 hours, are slowly impregnated, under pumping of nitrogen and mechanical stirring, with a solution containing 2.39 mmoles of Vanadium (III) acetylacetonate in a volume of toluene equal to the pore volume of the carrier.

After leaving under stirring for 10 minutes, the catalyst thus prepared is dried.

It is then saturated with ethylene and 4.3 mmoles of DEAC in 50 cm$^3$ of hexane are rapidly added. The mixture is left to react at room temperature for about 60 minutes and is then left to decant. The liquid is perfectly colourless. The liquid is separated, and the solid is dried under vacuum obtaining 7.93 grams of powder containing 1.5% of Vanadium.

B) Copolymerization of ethylene and propylene.

744 grams of liquid propylene are charged into the pressure-resistant reactor described in comparative example 6, the reactor is thermostat-regulated at 40° C., saturated with ethylene until an overpressure of 6 bar is reached and then a further overpressure of 0.1 bar of hydrogen is added. The total pressure in the top of the reactor was 21.6 bar.

A hexane solution containing 6.03 mmoles of DEAC and subsequently an aliquot of the catalyst previously prepared equal to 0.061 grams of Vanadium suspended in hexane and containing 0.95 mmoles of ethyl trichloroacetate are then added. The reaction is carried out at a constant temperature, feeding ethylene in continuous to maintain the total pressure constant (molar ratio Al/V=50).

After 60 minutes, the monomers are then evaporated and the reactor is opened: 120 grams of polymer in a subdivided form but partially agglomerated, not free-flowing, are recovered, equal to a yield of 19.7 kg of polymer per gram of Vanadium. The characterizations of the copolymer are summarized in table 2.

EXAMPLE 13

Copolymerization of Ethylene and Propylene 744 grams of liquid propylene are charged into the same pressure-resistant reactor described above, the reactor is thermostat-regulated at 40° C., saturated with ethylene until an overpressure of 6 bar is reached and then a further overpressure of 0.1 bar of hydrogen is added. The total pressure in the top of the reactor is 21.6 bar.

A hexane solution containing 6.03 mmoles of DEAC and subsequently an aliquot of the catalyst of example 12 equal to 0.061 grams of Vanadium suspended in hexane and containing 0.95 mmoles of ethyl trichloroacetate are then added. The reaction is carried out at a constant temperature, feeding ethylene in continuous to maintain the total pressure constant (molar ratio Al/V=50).

After 60 minutes, 5 grams of silica of the type Ultrasil VN3 suspended in methanol are poured into the reaction mixture. The monomers are evaporated and the reactor is opened: 110 grams of polymer in a subdivided form and perfectly free-flowing, are recovered, equal to a yield of 18 kg of polymer per gram of Vanadium. The characterizations of the copolymer are summarized in table 2.

TABLE 2

| Example | Propylene % | ML at 125° C. | Yield kg/g | Cryst. PE % | Comments |
|---|---|---|---|---|---|
| comp. 6 | 40.5 | 50 | 54 | 2.5 | not free-flowing |
| 7 | ND | 54 | 54 | 2.5 | perfectly free-flowing |
| 8 | 41.2 | 61 | 54.4 | 2.6 | perfectly free-flowing |
| comp. 9 | 41 | 19 | 45.7 | 2.5 | partially free-flowing |
| comp. 10 | 38.6 | 70 | 31 | 2.2 | not free-flowing |
| 11 | ND | 54 | 30 | 2.4 | perfectly free-flowing |
| comp. 12 | 36.8 | 56 | 19.7 | 1.03 | not free-flowing |
| 13 | 35.8 | 93 | 18 | 1.05 | perfectly free-flowing |

As far as examples 7 and 11 are concerned, it was not possible to determine the content of linked propylene as the polymers could not be subjected to IR analysis on films.

I claim:

1. A process for the preparation of free-flowing particles of copolymers of ethylene with propylene and optionally another diene in a suspension of liquid monomer, in the presence of a catalyst selected from the group consisting of (a) Titanium salt supported on Magnesium salt and (b) compound of Vanadium soluble in hydrocarbon solvents either supported on an inert material or prepolymerized, and a co-catalyst consisting essentially of an organoaluminum compound, and optionally, a chlorinated activator, comprising:

1) adding a solid material insoluble in the reaction environment and having an average diameter of between 0.001 and 200 microns to the reaction mixture after the polymerization is complete;

2) contacting the suspension of polymer and solid material for a sufficient time to obtain free-flowing polymeric particles;

3) recovering the free-flowing polymeric particles of step (2).

2. The process according to claim 1, wherein the solid material has an average diameter of between 0.005 and 5 microns.

3. The process according to claim 1, wherein the solid material has a surface area of over 10 m$^2$/g, and a porosity of more than 20 ml/100 g.

4. The process according to claim 3, wherein the solid material has a surface area of more than 40 m$^2$/g, and porosity of more than 80 ml/100 g.

5. The process according to claim 1, wherein the solid material is selected from silica and carbon black.

6. The process according to claim 5, wherein the solid material is silica having average dimensions of between 0.01 and 0.025 microns, a surface area of between 130 and 200 m$^2$/g and a porosity of between 200 and 300 ml/100 g.

7. The process according to claim 5, wherein the solid material is carbon black having average dimensions of between 0.015 and 0.04 microns, a surface area of between 50 and 100 m$^2$/g and a porosity of between 80 and 120 ml/100 g.

8. The process according to claim 5, wherein the solid material added to the reaction mixture is at least 0.05% by weight with respect to the polymer formed.

9. The process according to claim 8, wherein the solid material is from 0.5 to 8% by weight with respect to the polymer.

* * * * *

UNITED STATES PATENT AND TRADEMARK OFFICE
CERTIFICATE OF CORRECTION

PATENT NO. : 5,804,614
DATED : September 8, 1998
INVENTOR(S) : Tiziano Tanaglia

It is certified that error appears in the above-identified patent and that said Letters Patent is hereby corrected as shown below:

Title page,
Item [30], Foreign Application Priority Data, should be:
-- Sep. 14, 1995    [IT]    Italy..................MI95A    001910
   Nov. 30, 1995    [IT]    Italy..................MI95A    002499 --

Signed and Sealed this

Eighteenth Day of January, 2005

JON W. DUDAS
*Director of the United States Patent and Trademark Office*